Jan. 21, 1936.  A. NOVICK  2,028,163
PROCESS AND APPARATUS FOR MANUFACTURING PAPER CUPS
Original Filed Jan. 11, 1930  14 Sheets-Sheet 1
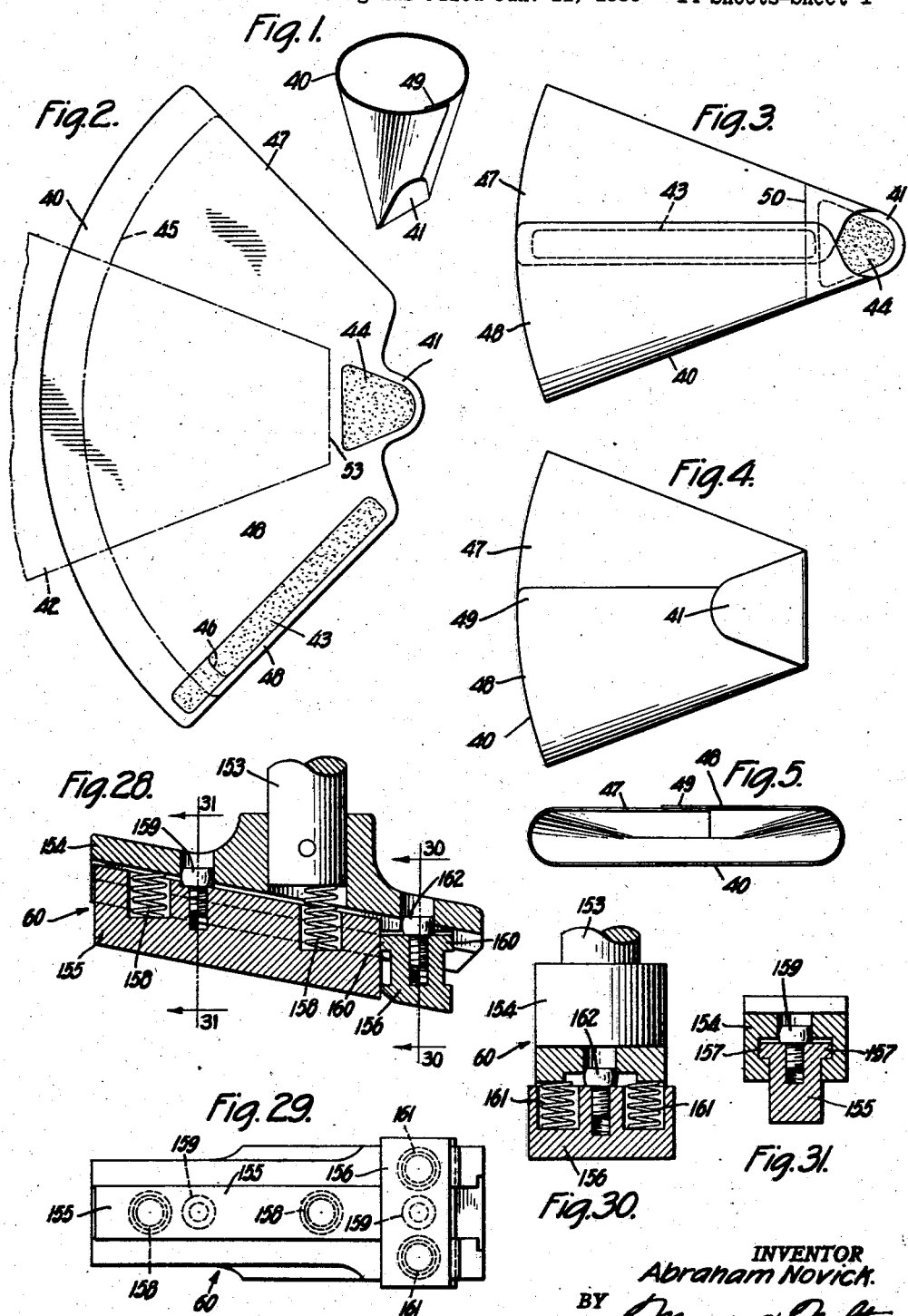
INVENTOR
Abraham Novick.
BY
ATTORNEYS Jan. 21, 1936.  A. NOVICK  2,028,163
PROCESS AND APPARATUS FOR MANUFACTURING PAPER CUPS
Original Filed Jan. 11, 1930  14 Sheets-Sheet 2
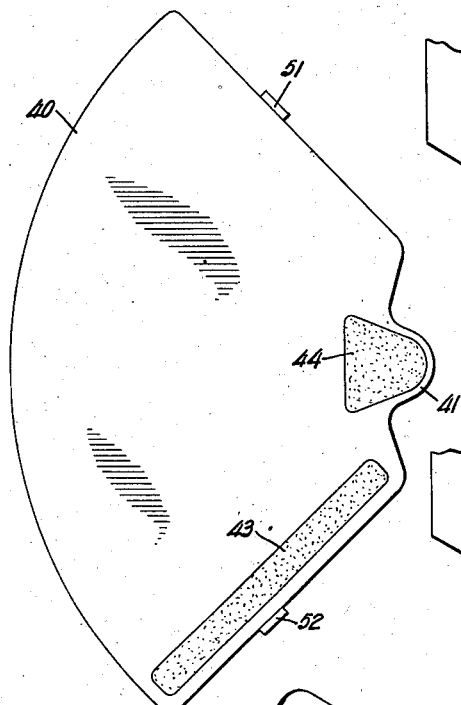
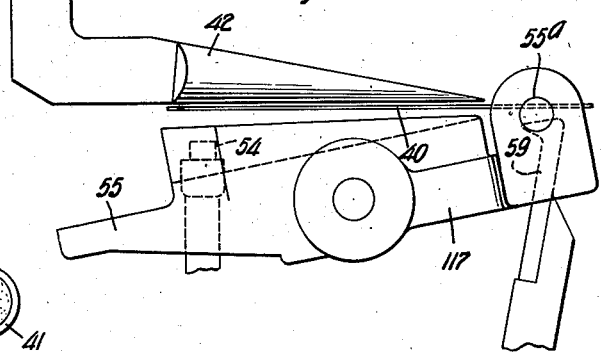
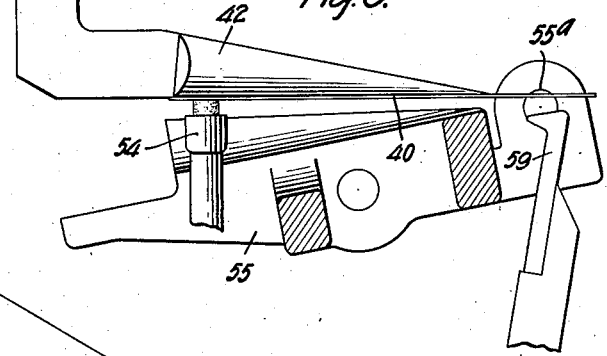
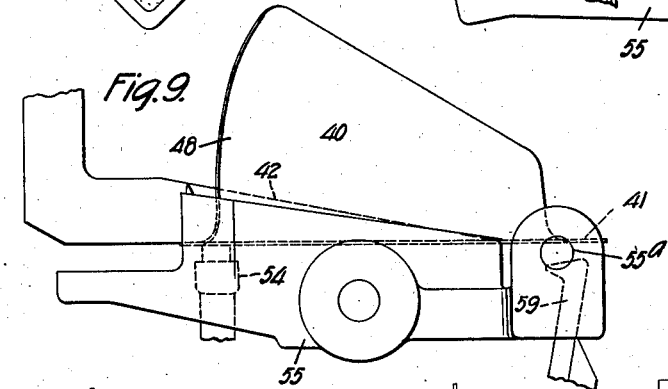
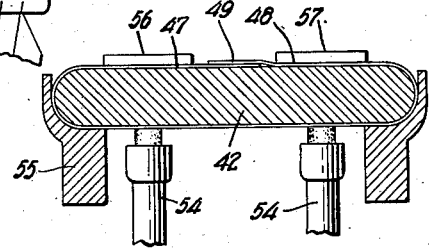
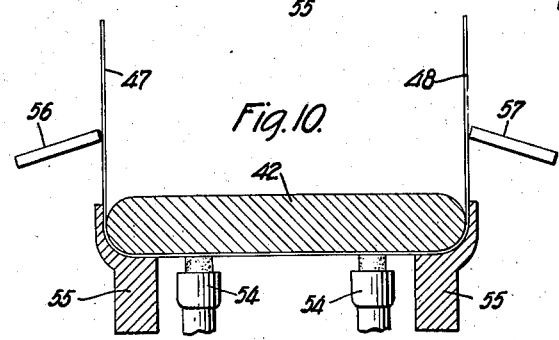
INVENTOR
Abraham Novick.
BY Moses & Nolte
ATTORNEYS Jan. 21, 1936.     A. NOVICK     2,028,163
PROCESS AND APPARATUS FOR MANUFACTURING PAPER CUPS
Original Filed Jan. 11, 1930    14 Sheets-Sheet 3
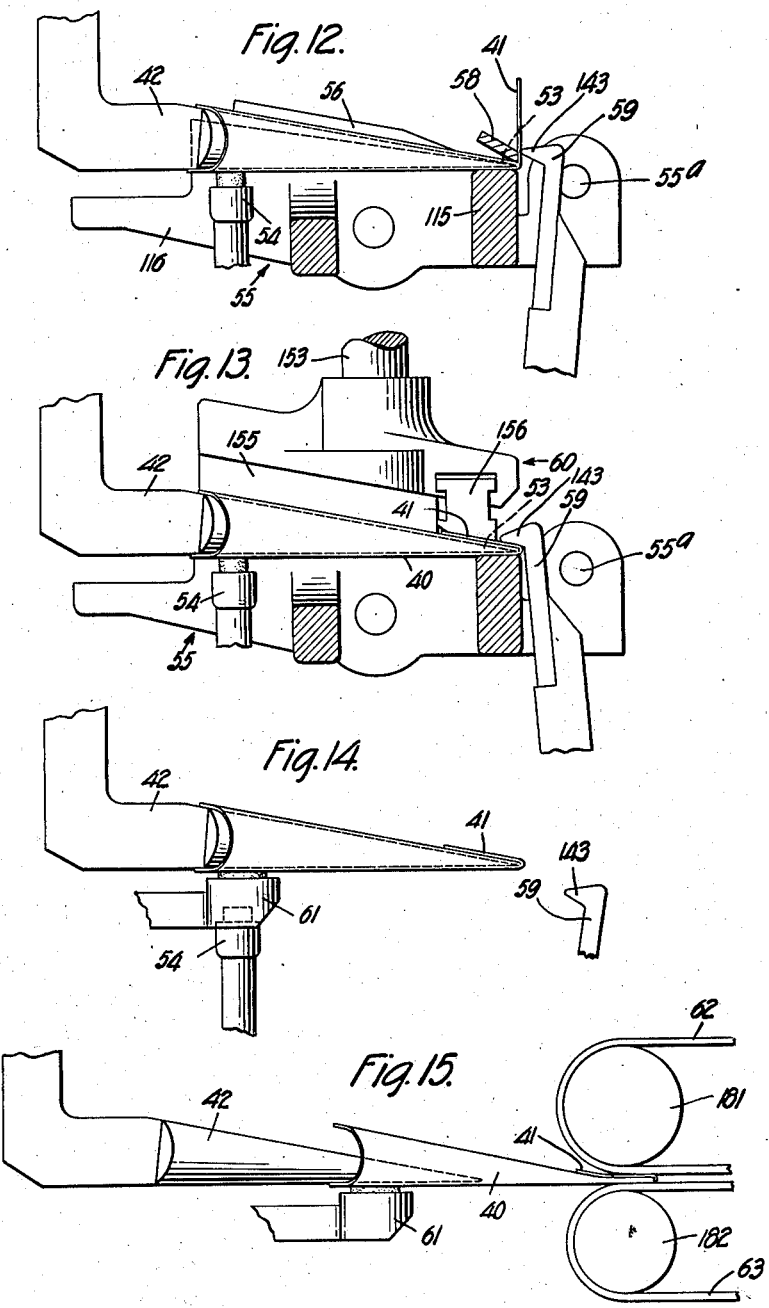
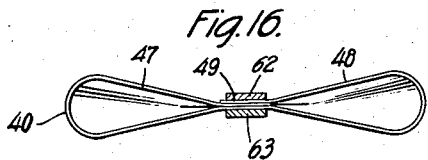
INVENTOR
Abraham Novick.
BY
ATTORNEYS

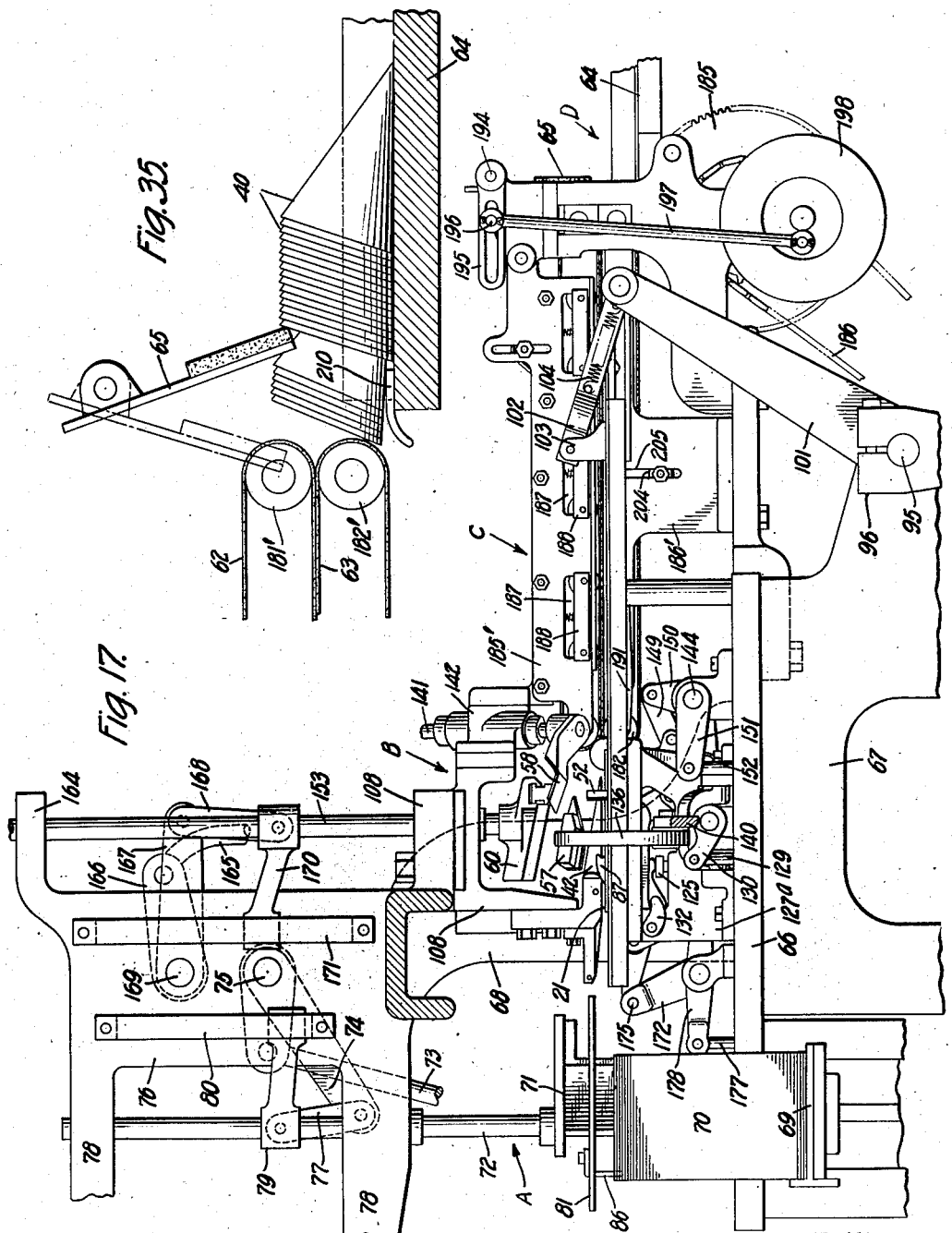

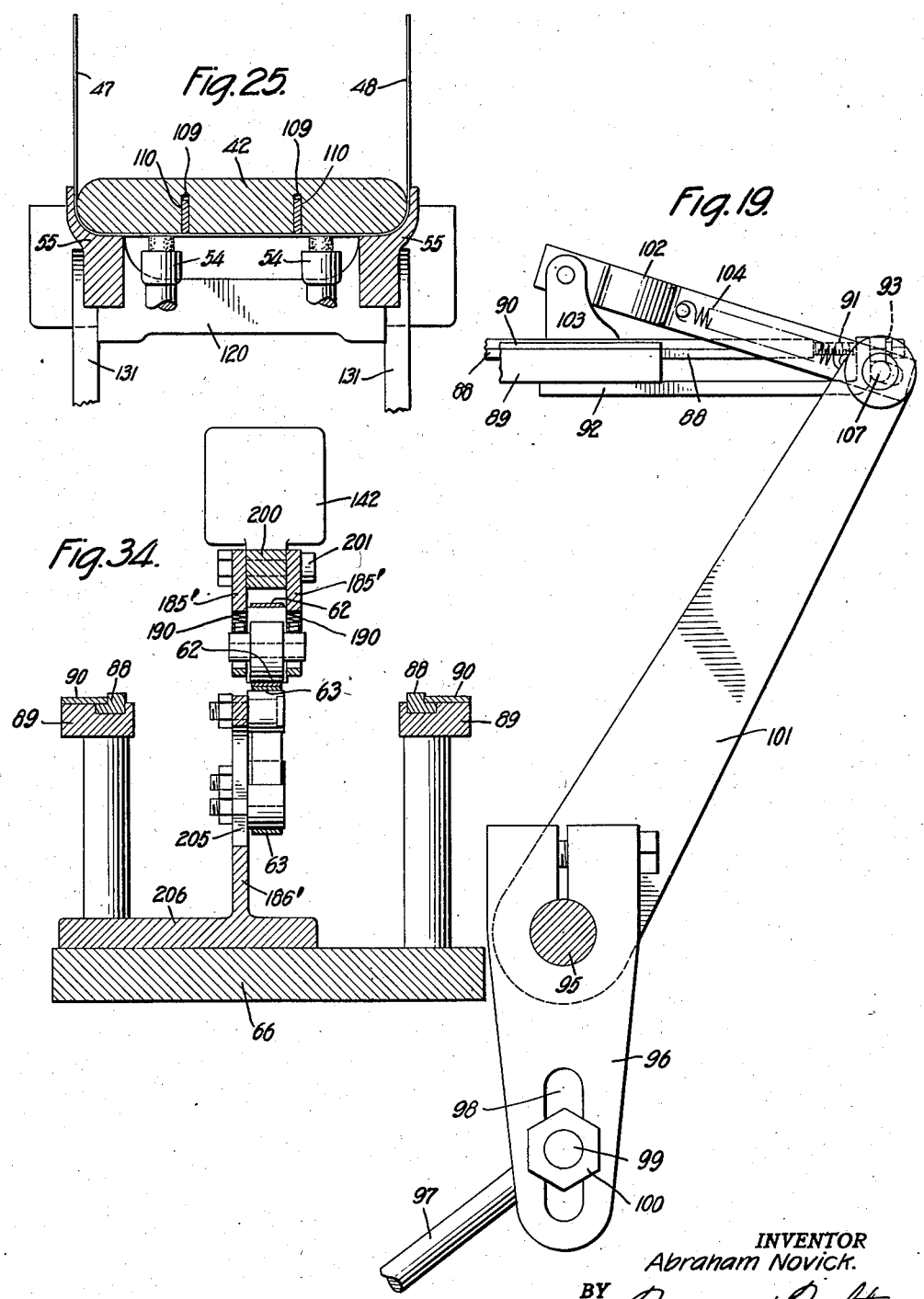

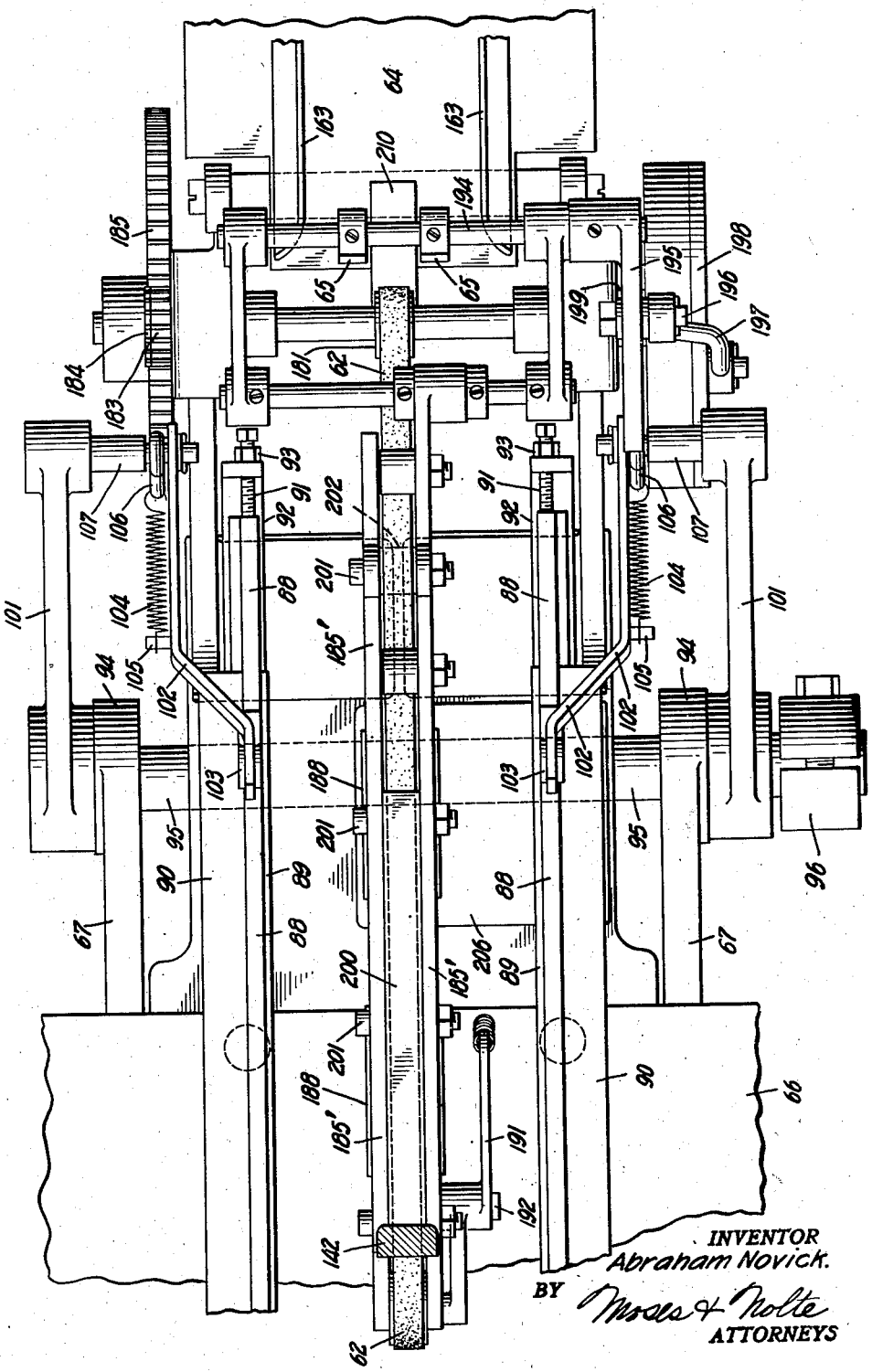

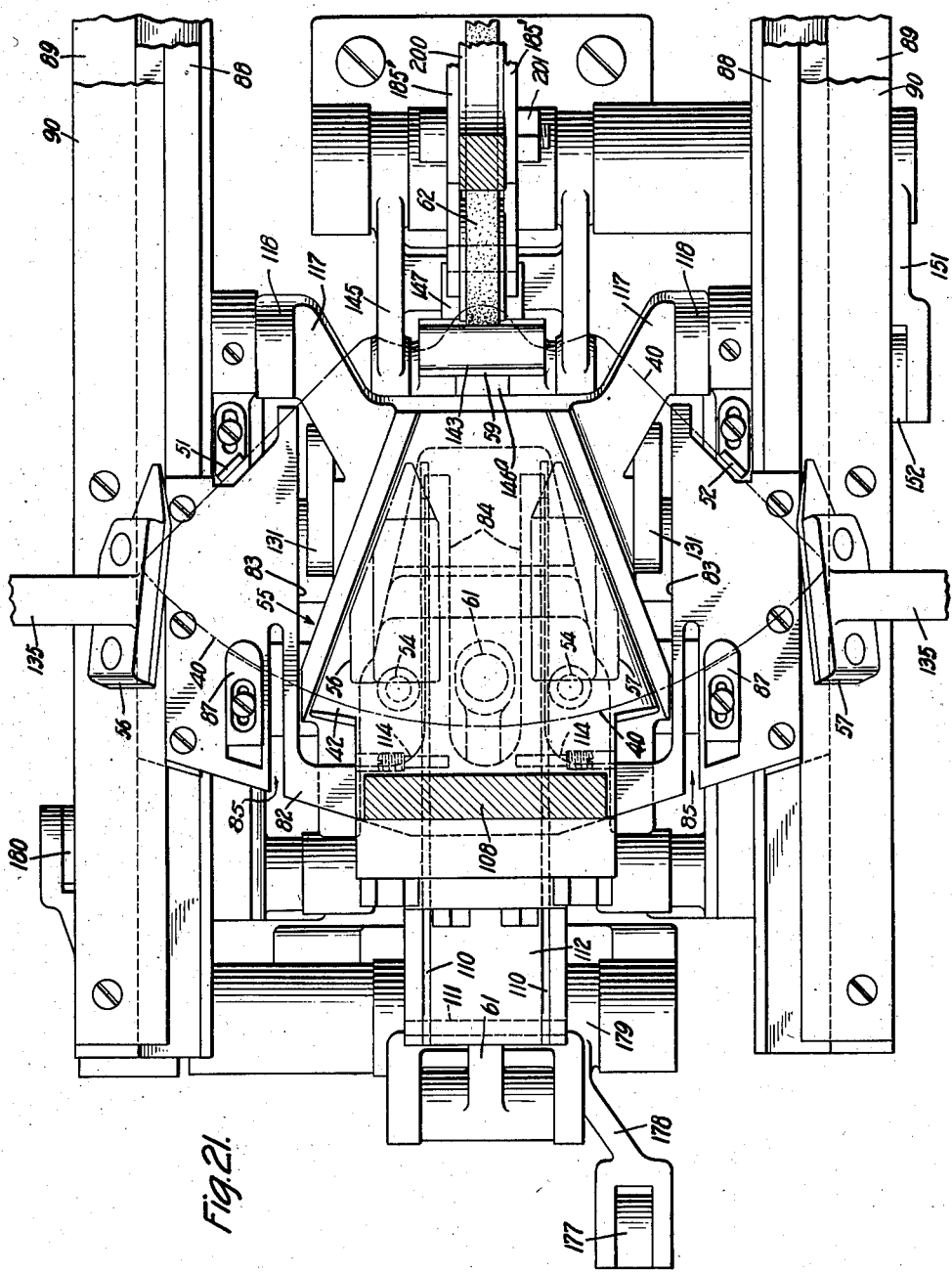

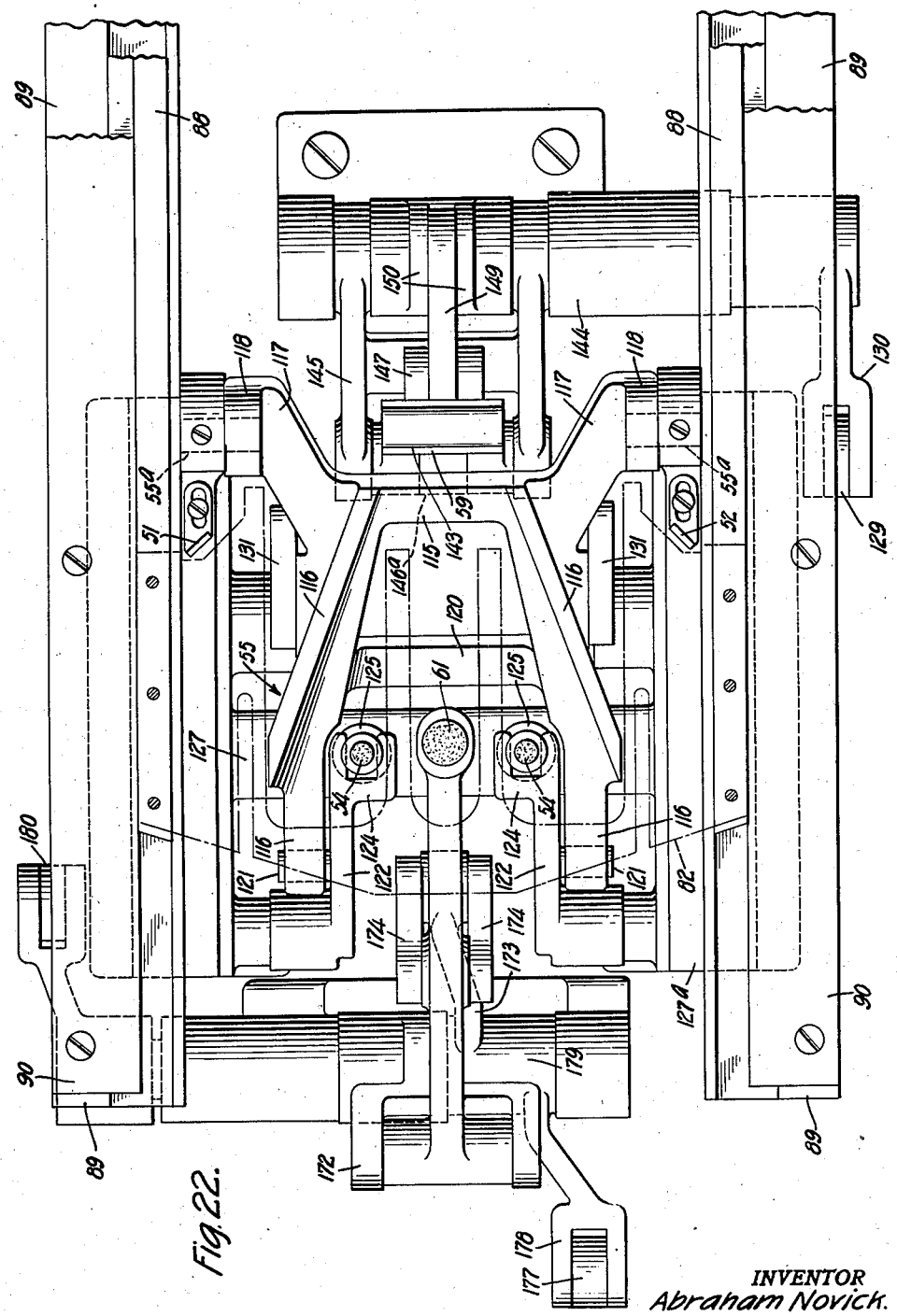

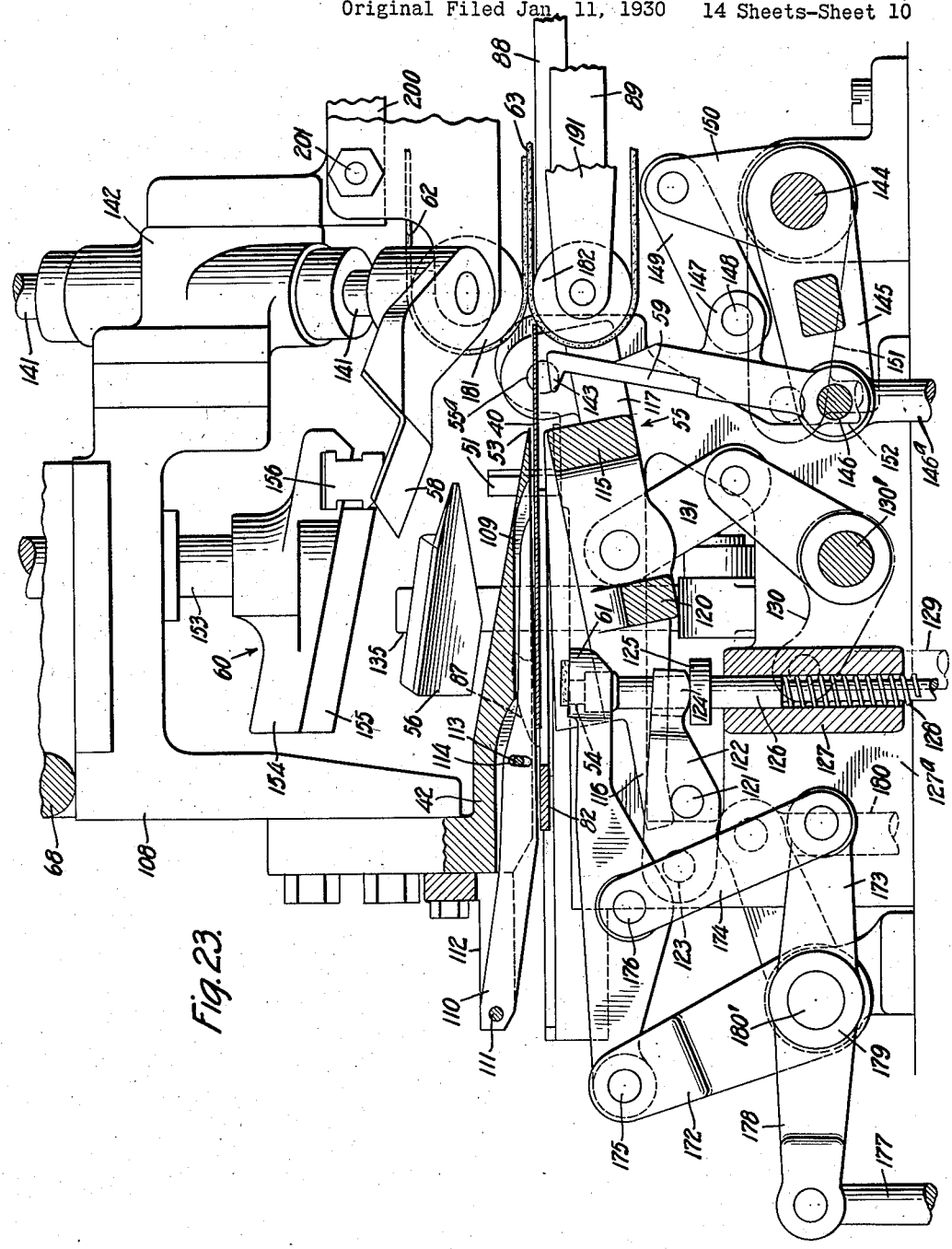

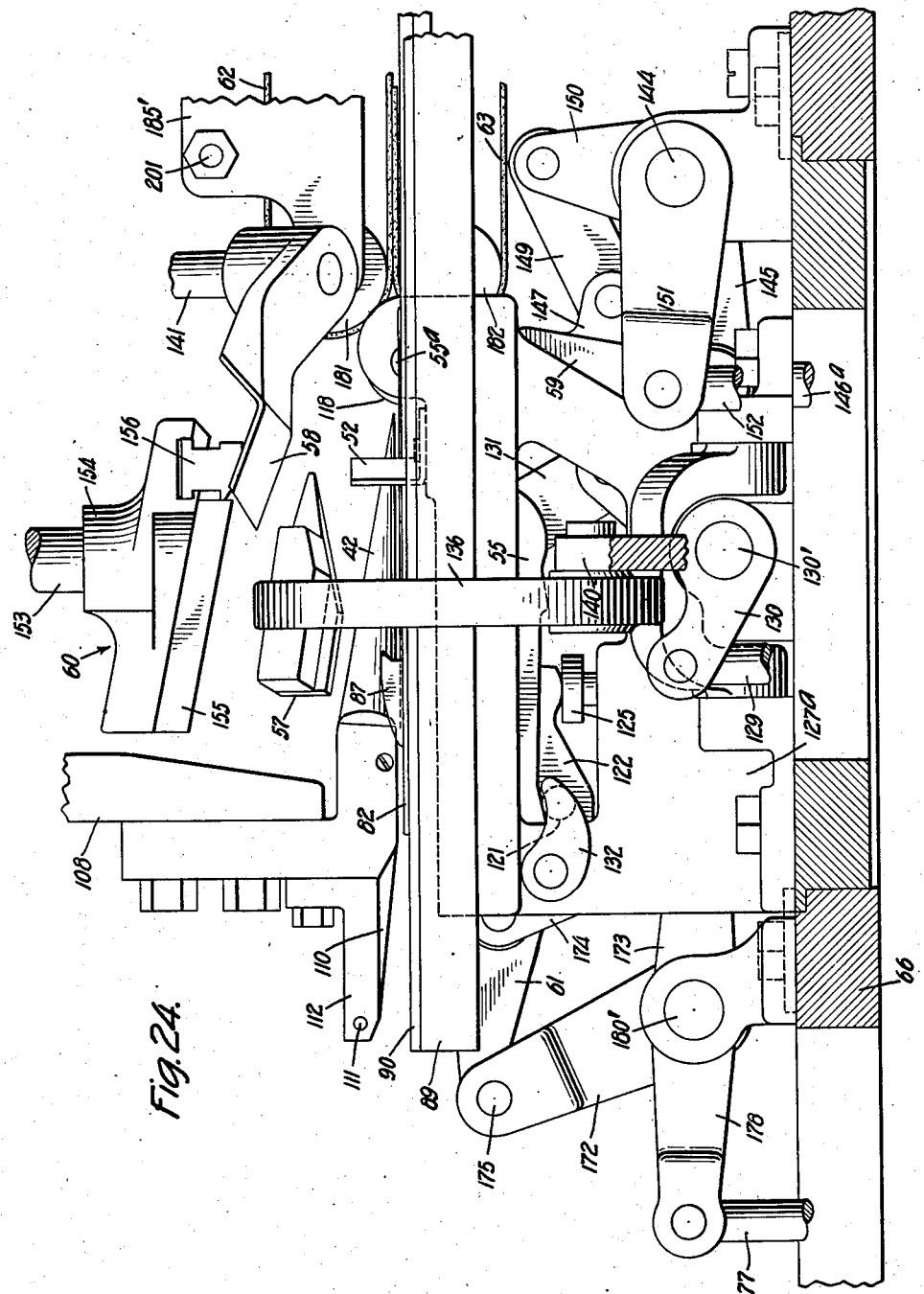

Jan. 21, 1936. A. NOVICK 2,028,163
PROCESS AND APPARATUS FOR MANUFACTURING PAPER CUPS
Original Filed Jan. 11, 1930 14 Sheets-Sheet 12
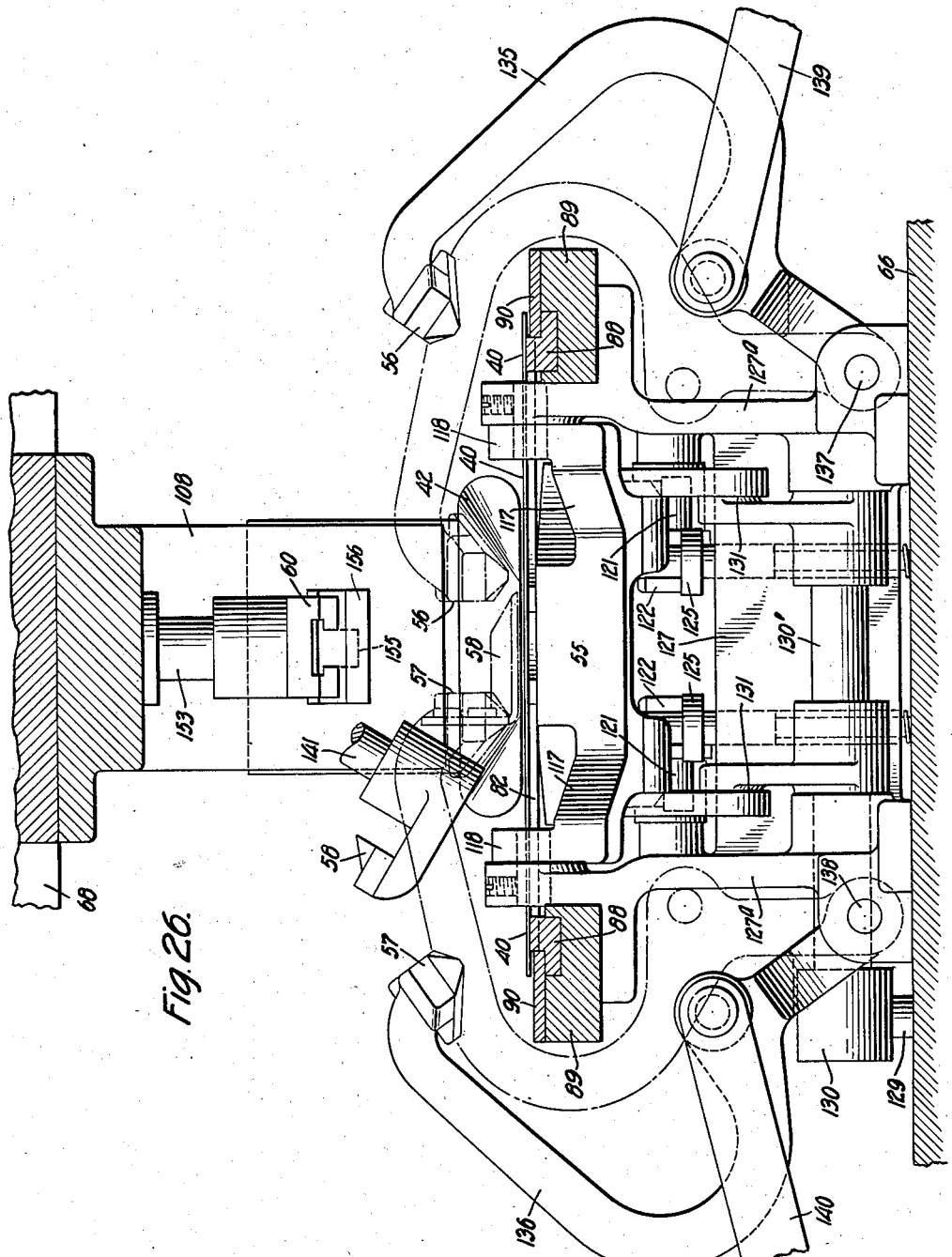
INVENTOR
Abraham Novick.
BY *Moses + Nolte*
ATTORNEYS Jan. 21, 1936. A. NOVICK 2,028,163
PROCESS AND APPARATUS FOR MANUFACTURING PAPER CUPS
Original Filed Jan. 11, 1930 14 Sheets-Sheet 13
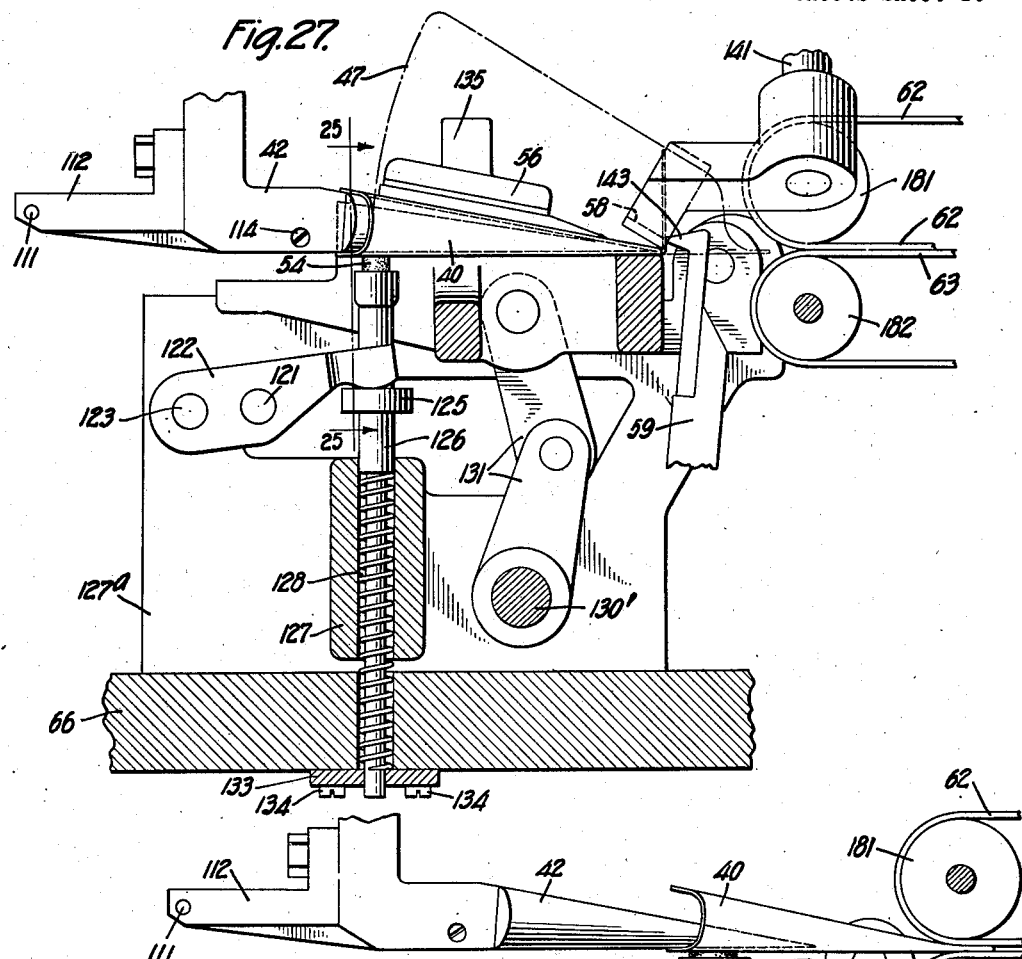
INVENTOR
Abraham Novick.
BY Moses & Nolte
ATTORNEYS

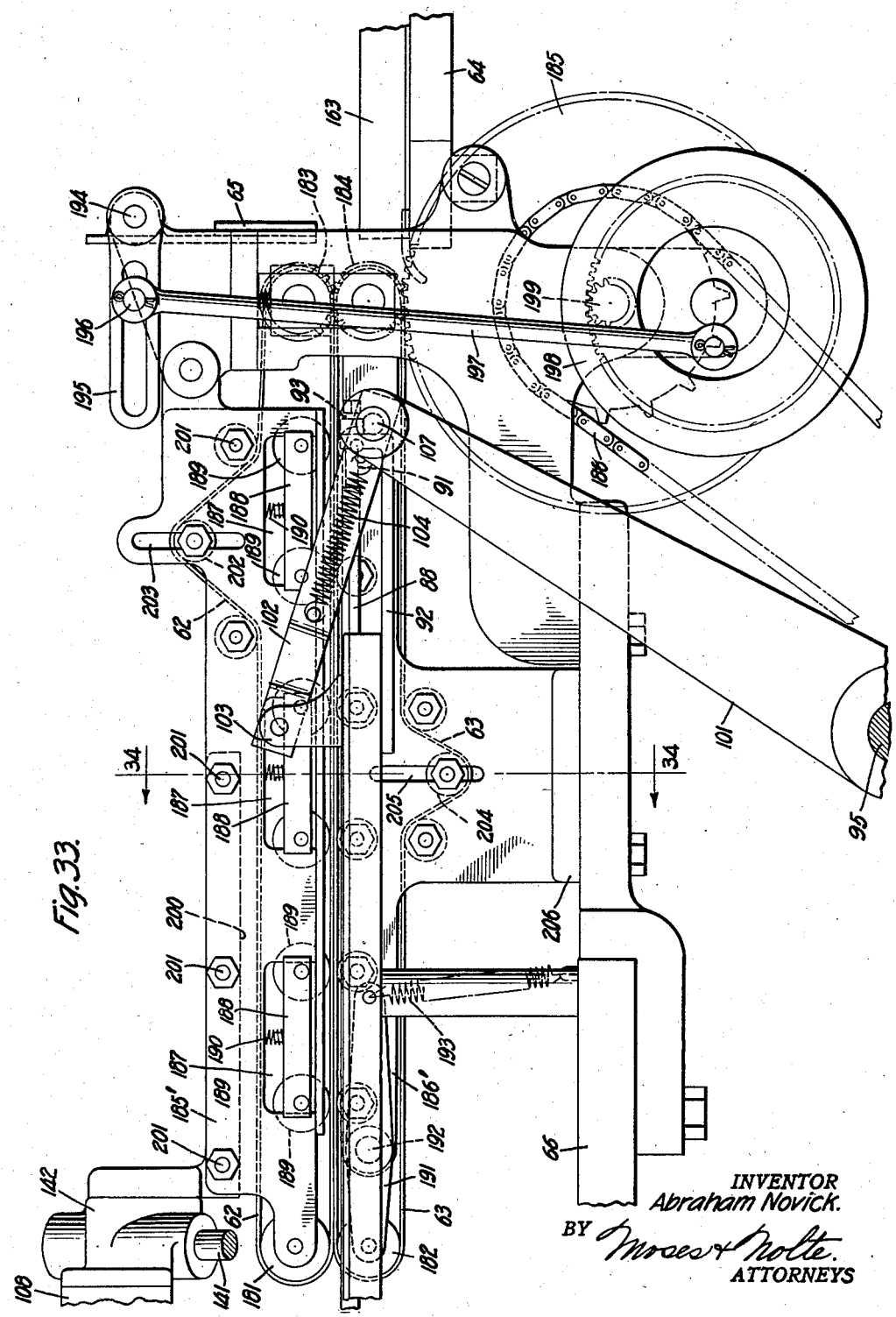

Patented Jan. 21, 1936

2,028,163

UNITED STATES PATENT OFFICE 2,028,163

PROCESS AND APPARATUS FOR MANUFACTURING PAPER CUPS

Abraham Novick, Flushing, N. Y., assignor to United States Envelope Company, Springfield, Mass., a corporation of Maine Application January 11, 1930, Serial No. 420,127
Renewed June 20, 1934

52 Claims. (Cl. 93—36)

The present invention relates to a process and apparatus for the manufacture of cups from paper or other sheet material.

The preferred form of cup with the manufacture of which the present invention is concerned, is substantially conical in shape and has a linear or wedge-like closure at the bottom thereof in place of the pointed closures in the conical cups of the prior art. The sides of the cup are uncreased, the only crease appearing in the cup being in the formation of the linear or wedge-like closure for the cup. The cups may therefore be nested for packaging or for dispensing and the material consumed in the manufacture of the cup is reduced to a minimum. The process of manufacturing the cup and the apparatus used in the manufacture of the cup are shown in the drawings in their preferred form and are described hereinafter, with specific reference to such drawings.

The various novel features of the invention are recited in the appended claims.

In the drawings:

Fig. 1 is a perspective view of the finished cup, as made by the form of embodiment of the invention illustrated in the drawings.

Figs. 2, 3, 4, and 5 illustrate diagrammatically the process for the manufacture of the cup of Fig. 1 and show the successive steps involved in the manufacture of the said cup.

Figs. 6 to 16 inclusive are diagrammatic showings of the various steps involved in the manufacture of the said cup and each includes a diagrammatic showing of the apparatus involved in such steps. More detailed descriptions of these steps and the apparatus will appear hereinafter.

Fig. 17 is a side view of the machine in its preferred embodiment.

Fig. 19 is a detail of the mechanism for moving the transfer table.

Fig. 20 is a detailed plan view of a portion of the machine.

Fig. 21 is a plan view of a portion of the machine illustrating the transfer table and its relation to the remainder of the apparatus.

Fig. 22 is a plan view of the machine taken immediately below the transfer table.

Fig. 23 is a vertical sectional view of the machine at its folding station prior to the operation of the female former.

Fig. 24 is a side elevation of the apparatus at the folding station.

Fig. 25 is a transverse sectional view, taken on the line 25—25 of Fig. 27, illustrating the operation of the female former.

Fig. 26 is a transverse sectional view of the apparatus at the folding station illustrating the folding over operation.

Fig. 27 shows the apparatus in the process of forming the end closure.

Fig. 28 is a longitudinal transverse sectional view of the presser foot.

Fig. 29 is a bottom plan view of the same.

Fig. 30 is a transverse sectional view taken on line 30—30 of Fig. 28.

Fig. 31 is a transverse sectional view of the portion of the presser foot taken on line 31—31 of Fig. 28.

Fig. 32 illustrates the operation of the ejecting mechanism.

Fig. 33 shows a detailed construction of the conveyor mechanism.

Fig. 34 is a transverse sectional view of the conveyor mechanism taken on the line 34—34 of Fig. 33.

Fig. 35 is a detailed view of the nesting device.

The invention will now be described with reference to the form of embodiment illustrated in the drawings. Similar characters of reference will be employed to designate similar parts in each of the several views.

Figure 18:
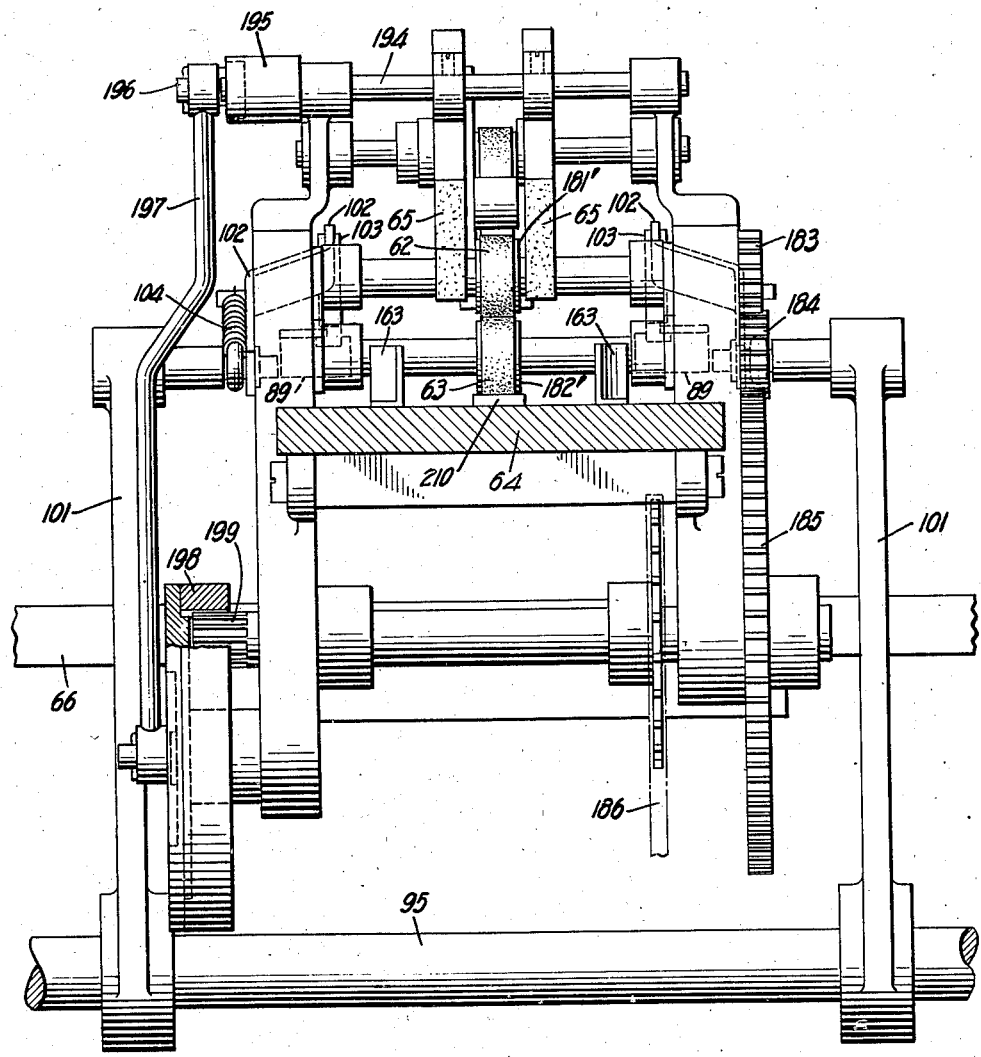
Fig. 18 is an end view of a portion of the machine of Fig. 17.

The finished form of the cup as made by the illustrated embodiment of the invention, is shown in Fig. 1 and is substantially conical in shape having a linear or wedge-like closure at the bottom thereof and uncreased on its sides so that its mouth is open and is circular or oval in shape.

The process

The process involved in the manufacture of this cup is diagrammatically illustrated in Figs. 2, 3, 4, and 5. The blank used for the manufacture of this cup is substantially in the form of a sector as shown at 40, the apex of the sector being cut out in such a manner as to provide a tab 41. All the operations for forming the cup take place while the blank is in one position, at the folding station of the apparatus, and all these operations take place about the male former, illustrated in broken lines in Fig. 2 and indicated by the reference character 42. Prior to the transfer of the blank to the folding station of the machine an adhesive, such as glue or paste or the like, is applied to the blank in the blocked in portions 43 or 44. The process as well as the machine disclosed herein is adapted for operation upon blanks of various sizes so as to make smaller or larger cups as desired. The broken line 45, shown in Fig. 2, illustrates a smaller size blank and the broken line 46 shows the outer end of the gummed area 43 when a smaller blank is operated upon.

Briefly, the process for making the cup of Fig. 1 involves the step of folding over the side portions 47 and 48, the portion 47 being folded over first and the portion 48 being folded over in such a manner that it overlaps the portion 47 and the gummed area 43 serves to seal these two portions and form a longitudinal seam 49 in the cup. At the same time a portion of the gummed area 44 causes that part of the main body portion of the blank to adhere to the side portions 47 and 48.

Fig. 3 shows the blank after this folding over has been completed. The broken line 50 shows the line along which the end closure is formed. The next step, therefore, involves merely the folding over of the end portion of the blank along the line 50 and the exposed gummed area 44 seals the end closure. The cup is then in the form shown in Figs. 4 and 5. When this cup is stripped from the former 42 it assumes the shape shown in Fig. 1.

*The process and related apparatus*

The above description outlines the process for the manufacture of the cup of Fig. 1, which is independent of any apparatus. A description of the process as related to the machine disclosed herein will now be given. This is clearly illustrated in Figs. 6 to 16 inclusive, these figures showing only those portions of the apparatus which are directly concerned in the step being illustrated.

Fig. 6 shows the blank 40 at its folding station, it being provided with the gummed areas 43 and 44 and resting against the stops 51 and 52.

Fig. 7 is a side view of the related apparatus with the blank in position ready to be operated on for the formation of a cup. The blank 40 is disposed immediately below the male former 42, which is wedge-like in shape having a rather sharp end 53 but having rounded side edges as will appear from an inspection of Figs. 10 and 11. In this position the blank 40 is somewhat spaced from the bottom of the former 42. Before the folding operation may proceed the grippers 54, only one of which is shown in Figs. 7 and 8, rise from the position shown in Fig. 7 to the position shown in Fig. 8, thereby pressing the blank against the bottom of the former 42. As the operation of the machine proceeds the female former 55 which is pivoted at 55a is moved from the position shown in Fig. 7 to that shown in Fig. 9. This former 55 is shaped to cooperate with the lateral edges of the male former 42 in the manner shown in Figs. 10 and 11. As a result of this operation the side portions 47 and 48 of the blank assume vertical positions as shown in Figs. 9 and 10.

As the operation of the machine proceeds, the side folders, diagrammatically illustrated by 56 and 57, operate to bring the side portions 47 and 48 respectively, from the position shown in Fig. 10 to that shown in Fig. 11. The operations of the side folders 56 and 57 overlap so that 47 assumes the horizontal position just prior to the completion of the operation of the folder 57.

The next operation involves forming the end closure which involves the cooperation of two elements which are properly timed in their operation to form the crease along the line 50, the edge 53 of the former 42 cooperating with the creaser 58 and the end folder 59. The creaser 58 which is in a position removed from the former and so positioned that it does not interfere with the operations of the side folders 56 and 57, is brought into the position shown in Fig. 12. The end folder 59 is also moved from the position shown in Fig. 7 to that shown in Fig. 12. The cooperation of the creaser 58 and the end folder 59 serves to form the transverse crease along the line 50 which appears in Fig. 3 of the drawings. After the completion of this operation the creaser 58 is again removed to its normal position and the end folder 59 is moved over to the position shown in Fig. 13, which folds over the end of the blank onto the main body portion as shown in Fig. 13.

The gummed areas 43 and 44 being moist all through these operations, they serve to seal the cup; the exposed area of the gummed area 44, readily observable in Fig. 4, serving to seal the end closure of the cup. In order to more effectually seal the cup a presser foot 60 is now lowered to the position shown in Fig. 13, which has a resilient pressing engagement with the sealing portions of the cup. This serves to complete the sealing of the cup and when the presser foot 60 is removed to its normal position the formed cup remains on the former 42, as is shown in Fig. 14.

Before stripper 61 comes into operation to remove the formed cup from the former 42, all of the operating elements which entered into the formation of the cup thus far described and which are still in their operative positions, are moved back to their inoperative positions. This applies particularly to the gripper fingers 54, the female former 55, the side folders 56, 57, and the closure former 59. The gripper fingers 54 and the female former 55 are moved back to the position shown in Fig. 7; the side folders 56 and 57 are moved back to the position shown in Fig. 10; and the end closure former 59 is moved back to the position shown in Fig. 7, the creaser 58 having previously been moved back to its normal position; the sealer foot 60 is also moved back to its normal position. This leaves the formed cup on the former 42 without any other portions of the apparatus holding the same in that position and the cup is now ready to be stripped from the former by the operation of the stripper 61.

The stripper 61 now comes into operation by moving from its normal position to that shown in Fig. 14 so as to press the cup against the former, this operation of the stripper 61 being followed by a movement in the direction of the end of the former 42, as is shown in Fig. 15. This operation of the stripper 61 serves to strip the cup from the former 42 and to feed the cup to a pair of conveyor belts 62 and 63. As will be seen from Fig. 16, the conveyor belts 62 and 63 are comparatively narrow so that the cup is gripped between the conveyors only along a longitudinal intermediate portion thereof with the result that no creasing of the main body portion of the cup takes place.

The formed cups are delivered by the conveyors to a table 64 and when these cups are released by the conveyors they spring into the form shown in Fig. 1. These cups are therefore fed into each other and are nested, a device 65 being operated intermittently to move the stack of cups to the right so that they do not interfere with the further feeding of the cups by the conveyors.

Having described the process of manufacturing the cup of Fig. 1 and having described the illustrative apparatus in brief outlines, various specific details of the machine will next be described.

The machine described briefly

The machine is best shown in its entirety in Fig. 17. Briefly the machine comprises a blank gumming and feeding station A and the apparatus therefor; a blank folding station B and the apparatus therefor; conveyor station C and the stacking and nesting station D.

The operating elements are disposed on the table 66 which is supported by the side frames 67. The power and cam means for controlling the timely operation of the various portions of the apparatus are disposed below the table 66 and are not shown herein, these means being common in the art and readily understood by those skilled in the art. In the operation of each portion of the apparatus a power transmitting link is operated by the power and cam means. A frame 68 in the form of an inverted U is part of the frame structure of the machine and in a sense serves to separate the blank gumming and feeding station A from the folding station B.

While the apparatus relating to each of the steps described in connection with the description of Figs. 6 to 16 hereinabove will be described in greater detail hereinafter by reference to various figures of the drawings, the relationship and arrangement of these parts will be readily appreciated from an inspection of Fig. 17, where the same reference characters that appear in Figs. 6 to 16 inclusive are shown applied to the corresponding operating elements.

Blank gumming and feeding apparatus

Referring to Fig. 17 and to the left hand end of that figure the platform 69 supports a stack of blanks 70. This platform is preferably elevated periodically so as to maintain the top of the stack at the desired level to co-operate with the gumming and feeding apparatus. The specific means for periodically elevating this platform are not shown herein for the reason that such devices are common in the art. The gummer 71 is reciprocated vertically by means of the plunger 72; the power being transmitted to the plunger 72 from the power and cam means by means of the link 73, the bell-crank lever 74, pivoted at 75 to the plate 76 carried by the frame member 68; and a link 77 pivotally connected to the free end of the bell-crank lever 74 and to the plunger 72. It will be seen, therefore, that a reciprocation at the link 73 will bring about a vertical reciprocation of the plunger 72 in the guide arms 78 of the plate 76, and that with the reciprocation of the plunger 72 the gummer 71 will be moved to and from the top of the stack of blanks 70. In order to prevent any possible rotation of the plunger 72 the laterally extending arm 79, fixedly carried by the plunger 72, engages at its free end with the guide 80 as shown.

When the plunger 72 and its associated gummer 71 are in their uppermost position, gum is applied to the gumming face by means of a transversely reciprocating roller, not shown. The gumming face of the gummer 71 is so designed that gum will be applied to the topmost blank in the manner shown in Figs. 2 and 6. The specific size and shape of the gummer 71 depends upon the size of blank operated on and upon the size of cup that is being made, for as has been explained hereinabove, a smaller cup needs a smaller gummed area 43.

After the gum has been applied to the gummer 71 in its uppermost position, the plunger 72 is moved downwardly so that the gummer 71 passes through corresponding apertures in the stripper plate 81 and is pressed down upon the topmost blank. On its return, or upward movement, the gummer 71 carries the topmost blank with it. Just before the blank strikes or reaches the bottom of the stripper plate 81 the motion of the gummer and plunger 72 is arrested temporarily so as to give the transfer table, whose operation is simultaneous with the operation of the plunger 72, an opportunity to come into position immediately below the blank. The plunger 72 then proceeds and completes its upward movement, the blank striking the bottom of the stripper plate 81 which releases the blank from the gummer 71 and deposits the same on the transfer table. The transfer table then completes its movement to bring the blank to the folding station B.

The transfer table or plate 82 is best shown in Fig. 21. It consists of a plate which is approximately the shape of the blank and is provided with cut out portions 83 to permit the female former 55 to pass from underneath the transfer plate 82 and to perform the necessary operations upon the blank shown by broken lines in Fig. 21, these cut out portions also serving to permit of the operation of the grippers 54 shown in dotted lines in Fig. 21. The transfer plate is additionally provided with a cut out portion 84 to permit of the operation of the stripper 61 shown in dotted lines in Fig. 21. Slots 85 are also provided in the transfer plate 82 which permit the plate to pass under the stripper plate 81 and free the backstop fingers 86, which are associated with the stripper plate 81. The transfer table is also provided with upstanding fingers 87 which engage the rear edge of the blank on the return movement of the transfer plate.

The transfer plate is carried by a pair of bars 88 which move longitudinally in guide rails 89. The bars 88 are L-shaped, as will be seen in Figs. 26 and 34, the foot of the L resting in the rail 89, and the rail 89 also carrying a guide plate 90 which is disposed over the foot of the L of the bars 88.

In order to provide for the operation of this machine on blanks of different sizes so as to make cups of different sizes, the limit of the return of the transfer table may be adjusted by means of the screws 91, Figs. 19, 20, and 33, which are carried by the upturned ends of the bars 92. The nuts 93 serve to lock the screws 91 in position.

The operating means for the transfer table and the slide bars 88 may be observed in Figs. 17, 19, and 20. The frame 67 is provided with bearings 94 which support the rock-shaft 95. The lever 96 is clamped onto one end of the rock-shaft 95 and is rocked by the link 97. The connection between the link 97 and the lever 96 is adjustable, as shown in Fig. 19, the lever 96 being provided with a slot 98 to receive the threaded pin 99 on the link 97, the nut 100 serving to hold this connection in the adjusted position. This adjustment is for the purpose of permitting the transmission of a rocking action to the rock-shaft 95 through a variable angle which must be adjusted for every size of blank or cut. A pair of levers 101 are fastened one at each end of the rock-shaft 95 so that these levers rock with the shaft. The links 102 formed as shown in Fig. 20 are pivotally connected to the free end of 101, preferably by means of a slot and pin engagement as shown in Fig. 19. The other ends of levers 102 are pivotally connected to uprights 103 which are integral with the slide bars 88. In order to

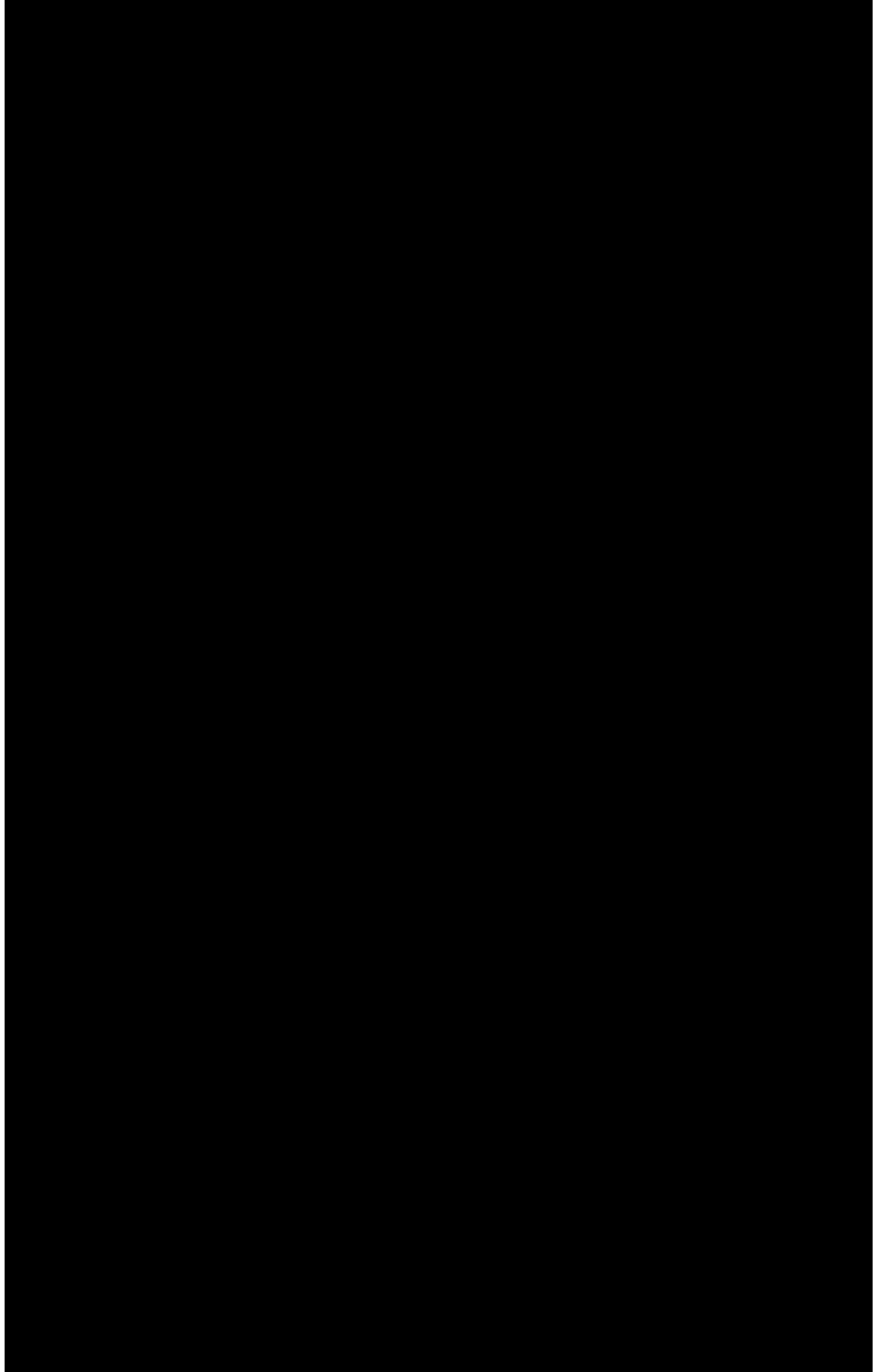

shown in Fig. 26 to the broken line position shown therein and free of the guide rails 89.

These levers are operated by the links 139 and 140, respectively, the power and cam means for operating these links being omitted for the sake of clarity. The operation of the lever 135 slightly precedes the operation of the lever 136 so that this lever completes its movement substantially before the completion of the movement of the lever 136, the result being that the side portion 47 of the blank reaches its folded position over the former 42 prior to the completion of the folding of the side portion 48. In this way the side portion 48 is made to overlap the side portion 47 and the gummed area 43 forms the seal between these two portions of the blank. It will be seen that at the same time a portion of the gummed area 44 causes the sealing of the lower ends of the side portions 47 and 48 of the blank against the gummed area 44, thereby assisting in the effective sealing of the end closure of the cup.

*The operation of the end closure apparatus*

After the completion of the side folding operation the end closure apparatus comes into play so as to form a crease along the line 50 shown in Fig. 3 and to fold over the end of the cup onto the main body portion thereof and to cause the exposed portion of the gummed area 44 to seal the end closure.

The creaser 58 is formed as shown in Figs. 17, 23, 24, 26, and 27. This creaser is carried by a rock-shaft 141, which passes through the bearing 142 carried by the bracket 108.

The rock-shaft 141 is disposed angularly and is disposed in such a manner that in its normal position as shown in Figs. 17, 23, 24, and 26, it does not interfere with the operation of any of the remaining apparatus. When the operation of the side folders 56 and 57 has been completed the shaft 141 is rocked so that the creaser 58 is made to occupy the position shown in Fig. 27 where it engages the blank along the line 50 which is substantially coincident with the edge 53 of the former 42. The end folder 59 is then moved from the position shown in Fig. 23 to the position shown in Fig. 27. With the assistance of the creaser 58 the end portion of the folded blank is thereby made to assume the dotted line vertical position shown in Fig. 27. This at the same time causes a sharp break along the line 50. This movement of the end folder 59 is a compound movement which involves both an upward movement of the blank and by it engages the end portion of the blank and moves it upward and a rearward movement towards the edge of the former 42. When the end folder 59 has reached the position shown in Fig. 27 the rock-shaft 141 of the creaser 58 is moved in the reverse direction so that the creaser 58 is again free from engagement with the blank. This is followed by a movement of the end folder 59 from the position shown in Figs. 12 and 27 to that shown in Fig. 13, wherein the lip 143 of the end folder 59 overlaps the former 42 and causes the end of the blank to assume the position shown in Figs. 13 and 14.

The mechanism for subjecting the end folder 59 to the compound movement described above, can best be observed in Figs. 21 to 24, inclusive, Figs. 21 and 22 showing this apparatus in plan and Figs. 23 and 24 showing it in side view through different planes.

The rock-shaft 144 carries the H-shaped member 145, the same being loosely carried on the rock-shaft 144. The other ends of the member 145 support the shaft 146, which in turn carries the end folder 59, the same being free to rotate thereon. A link 146a is connected to the shaft 146 by which the member 145 may be swung about the shaft 144 to raise and lower the folder 59. The end folder 59 is provided with an integral fork 147 which carries the pin 148 and which in turn supports one end of a link 149, the other end of the link being pivoted to the arms 150 secured to the shaft 144.

Either simultaneously with the operation of the shaft 141 to bring the creaser into position approximately coincident with the end of the former 42, or some short interval prior to the time that the creaser 58 has reached its operative position, an upward movement is applied to the folder 59 through the link 146a. The shaft 144 is also rocked by arm 151 through link 152 to swing the arms 150 in a counter clockwise direction. These motions are transmitted to the end folder 59 by link 149 and are converted into a combined upward and forward movement of the end folder 59 so that it reaches the position shown in Figs. 12 and 27. The upward movement of the folder 59 is obtained from the upward movement of the member 145; its forward movement is the result of the coaction of the elements 147 and 149, which increases the distance between the arm 150 and the folder 59. After the completion of this movement of the folder 59 and after the creaser 58 has moved from the position shown in Fig. 27 to its normal position, the folder 59 is moved from the position shown in Fig. 27 to that shown in Fig. 13, where the lip 143 overlies the end of the former 42 and folds the end of the blank onto the main body portion of the blank. This is accomplished by a short downward movement of the link 152 which rocks the shaft 144 in a counter clockwise direction and the desired movement is imparted to the folder 59 through the linkage 149 and 147.

The folding over of the end of the blank onto the main body portion described immediately above, causes the exposed portions of the gummed area 44 to hold the end closure in position.

*The operation of the presser foot*

After the completion of the operations described immediately above the cup is fully formed on the former but before it is complete and ready to be stripped from the former, the sealing of the cup must be completed more effectively. This is accomplished by bringing into operation the presser foot 60. The construction of the presser foot will be readily understood from an inspection of Figs. 28 to 31 inclusive. The plunger 153 carries the main body member 154 which supports the foot portion 155 and the heel portion 156; the portion 155 being so disposed that it presses down upon that portion of the blank that is approximately coincident with the gummed area 43, while the heel portion 156 presses down upon that portion of the blank which is approximately coincident with the gummed area 44, in the completed cup. The portion 155 is provided with flanges 157, the main body portion 154 being provided with guideways to receive said flanges. Springs 158 are inserted in recesses in the foot 155, these springs providing a certain amount of resiliency to the pressing action of the foot 155. A screw 159 passes through an opening in the main body portion 154 to hold the foot 155 against any longitudinal movement, at the same time permitting a certain amount of up and down movement.

The heel portion 156 is provided with similar flanges 160 which cooperate with transverse guideways in the main body portion 154. The springs 161 are inserted in recesses in the heel portion 156 for the same purpose as springs 158 are inserted in the foot portion, and the screw 162 serves to hold the heel portion 156 against relative lateral displacement thereof.

The plunger 153 which carries the presser 60 passes through the bearing in the bracket 108 which is carried by the frame member 68 and also passes through a bearing in the guide arm 164 which is integral with the plate 76. Motion is transmitted to the plunger 153 by means of the operating link 165 and the linkages 166, 167, and 168, which are fixed to plate 76 at 169. It will be seen that an upward movement of the link 165 will move the plunger 153 upwardly and a downward movement of the same will move the plunger 156 downwardly so as to bring about a pressing engagement between 60 and the cup, as shown in Figs. 13 and 27.

In order to prevent any possible rotation of the plunger 153 a free end of the arm 170 carried thereby is guided by the guide plate 171.

It will be seen therefore, that after the end closure folder 59 has completed its operation in such a manner that the lip 143 has moved the end closure to its end position the operating link 165 is moved downward so as to bring the presser 60 into engagement with the formed cup (Fig. 13) and thereby bring about a more effective sealing of the gummed areas.

The stripping operation

After the completion of the operations above described all of the operating elements thus far described are moved to their normal positions so as to leave the completed cup free to be stripped from the former 42 and to be ejected therefrom and transferred to the conveyor belts 62, 63.

For this purpose the operating link 165 is operated to move the presser foot 60 to its normal position; the arm 151 is moved to bring the end closure folder 59 back to its normal position; the operating links 139 and 140 are operated to bring the side folders 56 and 57 back to their normal positions; and the operating link 129 is operated to bring the female former 55 and the gripper fingers 54 back to their normal positions.

The cup in its completed form still being held on the former 42 is now ready for the stripping and ejecting operation.

The ejector 61 whose construction and operation can best be understood by reference to Figs. 22, 23, and 32, is provided with a cork or rubber tip, and is operated by the linkage system 172, 173, and 174, the free ends of the links 172 and 174 being pivoted to the ejector 61 at the points 175 and 176. The operating end of the stripper 61 is normally disposed below the blank 40 and out of contact therewith. In order to perform the stripping and ejecting operation the stripper 61 is first raised about the point 175 until its cork tip presses against the bottom of the former 42 and against the cup that is on the former. This operation is followed by a forward movement of the stripper 61 so that the frictional engagement of its rubber tip strips the cup from the former 42 and leads its closed end towards the conveyor belts 62, 63.

For the first part of this operation, namely, for the operation of raising the operating end of the stripper 61 into frictional engagement with the cup on the former 42, the operating link 177 is moved downwardly, which is pivoted to the arm 178, the latter being integral with the sleeve 179 which also carries the link 173. This downward movement of the operating link 177 moves the link 173 from the full line position in Fig. 23 to the dotted line position shown in Fig. 23, with the result that the stripper 61 is moved about the shaft 175 to its raised position where it is in frictional engagement with the cup. This operation is then followed by a downward movement of the operating link 180 which rocks the shaft 180' and thereby imparts a forward movement to forked arm 172 and consequently the linkage system is moved into the position shown in Fig. 32, the stripper 61 having moved forwardly so that the cup is stripped from the former 42 and transferred to the conveyors 62, 63, which complete the removal of the cup 40 from the former 42 and transfer the same onto the table 64, this table being provided with a pair of side guards 163.

The conveyor system

The conveyor system is best shown in Figs. 18, 20, and 33 and comprises a pair of cooperating endless conveyor belts 62, 63, which travel over the guide rolls 181 and 182, respectively, at one end, power being applied to the driven rolls 181' and 182' at the other end by gears 183 and 184; these being driven by the gear 185, power being transmitted to the same by means of the sprocket chain 186.

The belts 62 and 63 are narrow compared with the width of the cup and are preferably even somewhat narrower than the linear closure of the cup. The cup is therefore conveyed between the belts 62 and 63 in the form shown in Fig. 16 so that no creasing of any sort takes place in the sides of the cup.

The guide roll 181 is mounted between a pair of plates 185' while the guide roll 182 is carried by a lever 191, which is pivoted on a plate 186' at 192. The pair of plates 185' is further provided with a series of openings 187, braces 188 being carried on the outside of said plates for supporting the pressure rolls 189, which are pressed down against the conveyor belt 62 by means of the spring 190.

In order to provide a firm but resilient engagement between the conveyor belts 62 and 63 at the point where the cup enters the same, the roller 182 is preferably carried by the lever 191 which is pivoted to the frame member 186' at 192. The free end of the lever 191 is drawn downwardly by the spring 193.

The pair of plates 185' also serves to clamp between them the extended foot 200 which is integral with the bracket 142 and is clamped between the plates 185' by means of a series of bolts 201. This construction may be observed in Figs. 33 and 34. It will be seen, therefore, that the brackets 108 and 142 which are carried by the frame member 68, form together with the above mentioned extension of 142, namely, the extended foot 200, a frame that spans the folding station B.

The conveyor 62 also passes over a roller 202, which may be adjusted in any position in slots 203 of the side plates 185' for the purpose of taking up the slack in the conveyor. A similar roller 204 is provided in connection with the conveyor 63, the roller being slidable in slot 205 of the lower plate 186'. By referring to Fig. 34, it will be observed that the plate 186' is provided with a base 206 which gives firm support to the conveyor 63, this base being supported on the bed plate 66.

The nesting operation

After the cups leave the conveyor system and are transferred to the table 64, they spring into the form shown in Fig. 1, having a substantially circular mouth. As these cups are fed by the conveyor system onto the table 64 they are guided between bars 163, Figs. 18, 20, and 33, secured to the table 64 and are nested into each other. In order to prevent any undue piling up of the cups on the table immediately adjacent to the conveyor system, a pair of devices 65 are provided operating on each side of the belt 62, as will be seen in Fig. 18, which operate periodically to push the accumulated cups away from the conveyor system, and in so doing wedge the cups into each other, with the result that in case a slow drying gum is used, the seams of the cups are prevented from springing open before the gum is sufficiently dried to form a permanent seam.

The cups tend to spring back towards the conveyor or follow the devices 65 upon their return stroke A stop 210, secured to the table 64, overcomes this springing action of the gang of cups, and thus prevents their return to the end of the conveyor. It will be understood that the cups are flexible and consequently those which have accumulated at the end of the conveyor do not interfere with the return of the devices 65 but are pressed down slightly when the devices 65 pass over them.

The devices 65 are carried by rock-shaft 194. Rock-shaft 194 carries at one end a slotted arm 195 which receives the stub 196 of the rod 197, which is operated eccentrically by the gear 198, the same being rotated by the gear 199 which is on the same shaft with the gear 185 and operated thereby. It will be seen that as the operation of the conveyor system proceeds the devices 65 will be oscillated between the dotted line position shown in Fig. 35 to the full line position shown therein and thereby move the accumulated cups away from the conveyor system.

While I have illustrated and described one preferred form of my invention it is understood that the invention may be embodied in other structures. I do not, therefore, desire to limit myself to the specific construction shown.

I claim:

1. The process of making a substantially conical cup comprising the steps of folding a blank of sheet material to form a flattened and longitudinally uncreased conical cup, and allowing the so formed cup to spring into its normal shape with a substantially circular mouth.

2. The method of making a cup having a substantially circular mouth, comprising the steps of folding a body of sheet material around a flattened male former to form a cup in a flattened condition, and removing the cup from the former, whereby said cup assumes the desired form.

3. The method of making a cup having a substantially circular mouth, comprising the steps of folding a blank into a cup having a non-circular mouth, restraining the cup in said form during the sealing operations, and removing said restraint upon the completion of the cup, whereby its mouth assumes the desired form.

4. The process of making a conical cup comprising the steps of gumming a sector like blank, placing said blank of sheet material adjacent a wedge like former having rounded edges, folding said blank over the said former, forming a transverse crease in the blank, and folding to form a bottom closure.

5. The process of making a conical cup comprising the steps of gumming a sector like blank, placing said blank of sheet material adjacent a wedge like former having rounded edges, folding said blank over the said former, forming a transverse crease in the folded blank, folding to form a bottom closure, pressing the gummed areas to seal said cup and removing said cup from said former.

6. The process of making a conical cup comprising the steps of gumming a sector like blank, placing said blank of sheet material below a wedge like former having rounded edges, pressing said blank against the said former, folding said blank over the said former, forming a transverse crease in the blank, folding to form a bottom closure, pressing the gummed areas to seal said cup, and removing said cup from said former.

7. The process of making a conical cup comprising the steps of gumming a sector like blank, placing said blank of sheet material below a wedge like former having rounded edges, pressing said blank against the bottom of said former, pressing said blank against the edges of said former, folding said blank over the top of said former, forming a transverse crease in the blank, folding to form a bottom closure, pressing the gummed areas to seal said cup, and removing said cup from said former.

8. In a machine for making paper cups, the combination of a nonrotatable male former, having flattened upper and lower faces and rounded longitudinal edges, means for folding a blank around said former to form a cup devoid of longitudinal creases, and means for removing the cup formed thereby from said former.

9. A machine for making paper cups having a folding station and conveying means for removing the paper cups from said folding station, a male former disposed at said folding station, means for folding a blank around said former to form a cup, and bodily movable means for initiating the removal of the formed cup from said former, said means also serving to feed said cups to said conveying means.

10. In a machine for making paper cups, a stationary male former and means for folding a blank around said former to form a cup, in combination with means for removing the formed cup from the male former comprising a stripper, and operating means for said stripper for bringing same into frictional engagement with the cup on said former and for moving said stripper bodily forward to remove said cup from said former.

11. In a machine for making paper cups, a stationary male former and means for folding a blank around said former to form a cup, in combination with means for removing the formed cup from the male former comprising a stripper disposed below said male former, and operating means for said stripper for bringing same into frictional engagement with the cup on the bottom of said former and for moving said stripper bodily forward to remove said cup from said former.

12. In a machine for making paper cups devoid of longitudinal creases, a male former consisting of a wedge like body having a linear edge of substantial length at one end and having rounded tapering longitudinal edges running straight to said linear edge.

13. In a machine for making paper cups devoid of longitudinal creases, a male former consisting of a wedge like body having a linear edge of substantial length at one end and having flattened upper and lower faces, and rounded tapering longitudinal edges running straight to said linear edge.

14. In a machine for making paper cups from a paper blank, the combination of a male former, a female former, and fingers for pressing said blank against one face of said male former, means for moving said fingers to operative position operable by the initial movement of said female former.

15. In a machine for making paper receptacles from a paper blank, a tapered male former, means for folding said blank longitudinally and in overlapping relation, and means cooperating with said male former for forming the end closure comprising a creaser blade and a folder.

16. In a machine for making paper receptacles from a paper blank, a tapered male former, means for folding said blank longitudinally and in overlapping relation, and means cooperating with said male former for forming the end closure comprising a creaser blade and an end folder, said creaser blade partaking of a movement from its inoperative to its operative position and from operative to inoperative position while the end folder moves from its inoperative to its fully operative position.

17. In a machine for making paper receptacles from a paper blank, a tapered male former, means for folding said blank longitudinally and in overlapping relation, and means cooperating with said male former for forming the end closure comprising a creaser blade and a folder, said creaser having an operative and an inoperative position, and said folder having one operation cooperating with said creaser in its operative position to form a crease, and a folding operation.

18. In a machine for making paper cups, from paper blanks, a tapered male former, means cooperating with said male former for forming a bottom closure therefor comprising a blade, having a normally inoperative position, and an operative position where it contacts with the blank along a line disposed transversely thereof, and bottom folding means cooperating with said blade when in its operative position to form a crease along said line, and operable to complete the fold after the movement of said blade to its inoperative position.

19. In a machine for making paper cups, the combination of a stationary male former, means for folding the side portions of a blank around the male former, means for forming the end closure of the cup, means for removing the formed cup from the male former comprising a stripper, and operating means for said stripper for bringing same into frictional engagement with the cup on said former and for moving said stripper bodily forward to remove said cup from said former.

20. In a machine for making paper cups, the combination of a stationary male former, means for folding the side portions of a blank around the male former, means for forming a transverse crease in said blank and for forming the end closure of the cup by folding the end portion on said crease, means for removing the formed cup from the male former comprising a stripper, and operating means for said stripper for bringing same into frictional engagement with the cup on said former and for moving said stripper bodily forward to remove said cup from said former.

21. In a machine for making paper cups, the combination of a stationary male former, means for folding the side portions of a blank around the male former, means for forming a transverse crease in said blank and for forming the end closure of the cup by folding the end portion along said crease, means for removing the formed cup from the male former comprising a stripper disposed below said male former, and operating means for said stripper for bringing same into frictional engagement with the cup on the bottom of said former and for moving said stripper bodily forward to remove said cup from said former.

22. In a machine for making paper cups, the combination of a stationary male former, a female former cooperating with and disposed below said male former, gripping fingers for pressing a blank against the bottom of said male former, means for operating said female former, means for operating said gripper fingers operable by the initial movement of said female former, means for folding the side portions of a blank against the top of the male former, means for forming a transverse crease in said blank and for forming the end closure of the cup by folding the end portion on said crease, means for removing the formed cup from the male former comprising a stripper and operating means for said stripper for bringing same into frictional engagement with the cup on said former and for moving said stripper forward to remove said cup from said former.

23. In a machine for making paper cups, the combination of a stationary male former, a female former cooperating with and disposed below said male former, gripping fingers for pressing a blank against the bottom of said male former, means for operating said female former, means for operating said gripper fingers restrained against movement by said female former, means for folding the side portions of a blank against the top of the male former, means for forming a transverse crease in said blank and for forming the end closure of the cup by folding the end portion on said crease, means for removing the formed cup from the male former comprising a stripper and operating means for said stripper for bringing same into frictional engagement with the cup on said former and for moving said stripper forward to remove said cup from said former.

24. In a machine for making paper cups, the combination of a stationary male former, wedge like in form, and having flattened upper and lower faces, a female former cooperating with and disposed below said male former, gripping fingers for pressing a blank against the bottom of said male former, means for operating said female former, means for operating said gripper fingers restrained against movement by said female former, means for folding the side portions of a blank against the top of the male former, means for forming a transverse crease in said blank and for forming the end closure of the cup by folding the end portion on said crease, means for removing the formed cup from the male former comprising a stripper and operating means for said stripper for bringing same into frictional engagement with the cup on said former and for moving said stripper forward to remove said cup from said former.

25. In a machine for making paper cups, the combination of a stationary male former, wedge like in form, and having rounded and tapering edges, and flattened upper and lower faces, a female former cooperating with and disposed below said male former, gripping fingers for pressing a blank against the bottom of said male former, means for operating said female former, means for operating said gripper fingers restrained against movement by said female former, means for folding the side portions of a blank against the top of the male former, means for forming a transverse crease in said blank and for forming the end closure of the cup by folding the end portion on said crease, means for removing the formed cup from the male former comprising a stripper and operating means for said stripper for bringing same into frictional engagement with the cup on said former and for moving said stripper forward to remove said cup from said former.

26. In a machine for making paper cups, the combination of a stationary male former, wedge like in form, and having rounded and tapering edges, and flattened upper and lower faces, a female former cooperating with and disposed below said male former, gripping fingers for pressing a blank against the bottom of said male former, means for operating said female former, means for operating said gripper fingers restrained against movement by said female former, means for folding the side portions of a blank against the top of the male former, means for forming a transverse crease in said blank and for forming the end closure of the cup by folding the end portion on said crease, means for removing the formed cup from the male former comprising a stripper, operating means for said stripper for bringing same into frictional engagement with the cup on said former and for moving said stripper forward to remove said cup from said former and conveyor means engaging said cup along a longitudinal median portion thereof.

27. In a machine for making paper cups, the combination of a stationary male former, wedge like in form, and having rounded and tapering edges, and flattened upper and lower faces, a female former disposed below said male former and having concave faces cooperating with said edges, gripping fingers for pressing a blank against the bottom of said male former, means for operating said female former, means for operating said gripper fingers restrained against movement by said female former and releasable by the initial movement of said female former, means for folding the side portions of a blank against the top of the male former, means for forming a transverse crease in said blank and for forming the end closure of the cup by folding the end portion on said crease, means for removing the formed cup from the male former comprising a stripper, operating means for said stripper for bringing same into frictional engagement with the cup on said former and for moving said stripper forward to remove said cup from said former and conveyor means engaging said cup along a longitudinal median portion thereof.

28. In a machine for making paper cups, the combination of a stationary male former, wedge like in form, and having rounded and tapering edges and flattened upper and lower faces, blank feeding means for placing a blank below said former, means for adjusting the feeding means for variably sized blanks, a female former disposed below said male former and having concave faces cooperating with said edges, gripping fingers for pressing a blank against the bottom of said male former, means for operating said female former, means for operating said gripper fingers restrained against movement by said female former and releasable for operating said fingers by the initial movement of said female former, means for folding the side portions of a blank against the top of the male former, means for forming a transverse crease in said blank and for forming the end closure of the cup by folding the end portion on said crease, means for removing the formed cup from the male former comprising a stripper disposed below said male former, operating means for said stripper for bringing same into frictional engagement with the cup on the bottom of said former and for moving said stripper forward to remove said cup from said former and conveyor means engaging said cup along a longitudinal median portion thereof.

29. A machine for making cups comprising a stationary tapered male former, means for associating a blank with said former, means cooperating with said former to fold the side portions of the blank in overlapped relation, and means cooperating with said former to form an end closure for said cup.

30. In a machine of the character described, a male former consisting of a wedge-like body having a linear edge of substantial length at one end and having rounded tapering longitudinal edges running straight to said linear edge, means for folding a blank about said former into cup shape to provide overlapping portions of the blank material, and means for uniting such overlapping portions of said blank.

31. The method of making a cup of the character described, which consists in providing a male former consisting of a body having rounded tapering longitudinal edges and having an end portion which is substantially wedge-shaped in cross section, providing a blank of sheet material, bending said blank about said former, folding the lower end of the blank against a side to shape the blank into cup form so that the bottom of said cup corresponds in shape to the end portion of said former, and causing said blank to retain such form by adhesively uniting overlapping portions of said blank.

32. The method of making a cup, which consists in providing a blank having a length greater than that of the sides of the cup to be formed, providing a wedge-like former having rounded longitudinal sides, and forming the cup from said blank by folding the same about said former in such manner as to crease the blank about the bottom edge of said former.

33. The method of making a cup having a substantially wedge-shaped bottom, which consists in providing a former having an end portion which is substantially wedge-shaped in longitudinal cross section taken at right angles to the edge of the wedge, folding a blank of sheet material about the former, so as to provide overlapping seam portions in the cup material and to form a fold in the blank material about said end portion, and uniting overlapping portions of the material to cause the folded blank to retain its cup-shape.

34. The method of forming a cup with a wedge-like bottom, which consists in providing a blank having a greater length than the length of the side wall of the cup to be formed, providing a former having an end portion with a relatively sharp edge and substantially wedge-shaped in longitudinal cross section taken at right angles to the edge of the wedge, folding the blank about such end portion to form a crease in said blank about said edge, and to provide overlapping portions of the cup material, and uniting such overlapping portions.

35. The method of forming a cup with a substantially wedge-like bottom, which consists in providing a blank having a greater length than the length of the side wall of the cup to be formed, providing a former having an end portion which is substantially wedge-shaped in longitudinal cross section taken at right angles to the edge of the wedge, folding the blank about such end portion to provide overlapping portions of the cup material, and uniting such overlapping portions to retain said fold.

36. The method of forming a wedge-like bottom in a cup of sheet material, which consists in providing a blank of such material having a greater length than the length of the side wall of the cup to be formed, providing a former having an end portion which is substantially wedge-shaped in longitudinal cross section taken at right angles to the edge of the wedge, and folding the blank about such end portion.

37. The method herein described, which consists in folding a blank of sheet material so as to form a cup having a normally open rounded mouth, a linear bottom and uncreased sides, said folded blank having overlapping areas disposed in a longitudinal median portion extending from said bottom crease, adhesively uniting said overlapping areas, conveying said folded blank and applying pressure to said blank only in said longitudinal median portion during the conveyance thereof, so as to avoid creasing the side edges of the cup.

38. In a machine for the manufacture of cups from blanks of sheet material, means for folding each blank to provide a cup having a normally open rounded mouth, a linear bottom and uncreased sides, with overlapping areas disposed in a longitudinal median portion extending from said bottom crease, means for applying adhesive to the blank for adhesively uniting said overlapping areas, means for longitudinally conveying the folded blank and for applying pressure to said areas, said means comprising members for engaging the blank in said median portion.

39. A machine for making cups of sheet material comprising a former having an end portion, which is substantially wedge-shaped in longitudinal cross section taken at right angles to the edge of the wedge, means for associating a blank with said former, and means cooperating with said former to fold a blank about said former, so as to provide overlapping seam portions extending from said end portion longitudinally of said cup and to form a fold in the blank about said end portion.

40. A machine for manufacturing cups from sheet material comprising a former of substantial width and thickness at one end and tapering toward the other end to form an edge capable of defining a fold, means cooperating with said former to wrap sheet material about said former so as to form in said material a plurality of lapped seams and a crease about the edge of said former to constitute a cup having a normally self-extended mouth and a linear bottom closure.

41. A machine for manufacturing cups from sheet material, comprising a former of substantial width and thickness at one end and tapering toward the other end to form an edge capable of defining a fold, means cooperating with said former to wrap sheet material about said former so as to form in said material a plurality of lapped seams and a crease about the edge of said former to constitute a cup having a normally self-extended mouth and a linear bottom closure, and means for stripping the cups from the former.

42. A machine for manufacturing cups from sheet material comprising a former of substantial width and thickness at one end and tapering toward the other end to form an edge capable of defining a fold, means cooperating with said former to wrap sheet material about said former so as to form in said material a plurality of lapped seams and a crease about the edge of said former with double folds at the corner of said crease to constitute a cup having a normally self-extended mouth and a linear bottom closure, and means for stripping the cups from the former and delivering them into seam-retaining nested relation.

43. A machine for manufacturing cups from sheet material, comprising forming means having a forming surface defining a figure which tapers from a substantially linear edge at one end toward a cross sectional area at the other end of substantial width and height, said section being taken at right angles to the longitudinal axis of the figure, means cooperating with said forming means to fold sheet material into the shape defined by said forming means to constitute a cup having a normally self-extended open mouth and a linear bottom closure.

44. A machine for manufacturing cups from sheet material, comprising forming means having a forming surface defining a figure which tapers from a substantially linear edge at one end toward a cross sectional area at the other end of substantial width and height, said section being taken at right angles to the longitudinal axis of the figure, means cooperating with said forming means to fold sheet material into the shape defined by said forming means with a plurality of lapped seams and a crease in the cup material at the said edge, to constitute a cup having a normally self-extended open mouth and a linear bottom closure.

45. A machine for manufacturing cups from sheet material, comprising forming means having a forming surface defining a figure which tapers from a substantially linear edge at one end toward a cross sectional area at the other end of substantial width and height, said section being taken at right angles to the longitudinal axis of the figure, means cooperating with said forming means to fold sheet material into the shape defined by said forming means with a plurality of lapped seams and a crease in the cup material at the said edge, to constitute a cup having a normally self-extended open mouth and a linear bottom closure and means for removing the cups from said forming means and delivering them into nested relation.

46. A machine for manufacturing cups from sheet material comprising a former of substantial width and thickness at one end and tapering toward the other end to form an edge capable of defining a fold, means to present blanks of the sheet material to said former, means to form said blanks about said former into cups having each a normally self-extended mouth and a linear bottom closure, said means including means for partially folding said blanks about said former and for holding them in partly folded position stationary with reference to the former, and means for overlapping the partially folded material and pressing the seam portions thus formed on said former, and means for stripping the cups from said former and delivering them into seam-retaining nested relation.

47. The process of making a cup of the character described which consists in forming a blank having an arcuate edge, placing said blank upon a support having a curved convex surface converging toward a linear end; and pressing said blank in order to conform the same to said support and to affix co-acting portions of the blank, and folding an end portion of the blank about the linear end of the former.

48. The process of making a cup of the character described which consists in wrapping a marginally-gummed blank having an arcuate edge about a rounded former all surface lines of which converge toward a linear end, and applying pressure to said blank in order to effect closure thereof, and folding an end portion of the blank about the linear end of the former.

49. The process of making a cup of the character described which consists in forming a plurality of blanks, stacking said blanks, gumming a plurality of marginal areas of one of said blanks and removing said blank from the stack, moving said blank to a rounded forming device the surface lines of which converge toward a linear edge, applying pressure to said blank to conform it to said forming device and to effect marginal closure thereof, folding an end portion of the blank about the linear edge of the forming device, and removing the thereby-formed cup from said forming device.

50. The process of making a cup having an ovate top and body and a linear bottom, which consists in cutting a blank with an arcuate edge, conforming said blank to a support having a rounded surface which converges toward a straight edge at a substantially right angle to the longitudinal axis of said support, affixing marginal portions of said blank while so conformed, and folding an end portion of the blank about the linear edge of the support.

51. The process of making a cup which consists in conforming a blank to a support having a rounded surface convergent toward the longitudinal axis of said support and terminating in a linear end, and effecting closure of said blank while so conformed, by adhesively uniting longitudinal margins of the blank and folding an end portion of the blank about the linear edge of the support.

52. In a machine for making cups, the combination of a forming device having a linear end and a rounded surface divergent from said end, said surface running directly to the linear end, means for juxtaposing a cup blank and said forming device, and means for adhering marginal portions of said blank to effect closure thereof.

ABRAHAM NOVICK.